US010595052B1

(12) United States Patent
Worley, III

(10) Patent No.: US 10,595,052 B1
(45) Date of Patent: Mar. 17, 2020

(54) DYNAMIC CLOUD CONTENT DISTRIBUTION

(75) Inventor: William Spencer Worley, III, Half Moon Bay, CA (US)

(73) Assignee: Amazon Technologies, Inc., Seattle, WA (US)

( * ) Notice: Subject to any disclaimer, the term of this patent is extended or adjusted under 35 U.S.C. 154(b) by 773 days.

(21) Appl. No.: 13/159,867

(22) Filed: Jun. 14, 2011

(51) Int. Cl.
*H04N 21/20* (2011.01)
*H04N 21/24* (2011.01)
*H04N 21/25* (2011.01)
*H04N 21/214* (2011.01)

(52) U.S. Cl.
CPC ........... *H04N 21/20* (2013.01); *H04N 21/214* (2013.01); *H04N 21/24* (2013.01); *H04N 21/25* (2013.01)

(58) Field of Classification Search
USPC .......................................... 725/25–31, 74–48
See application file for complete search history.

(56) References Cited

U.S. PATENT DOCUMENTS

| 6,810,527 | B1* | 10/2004 | Conrad | .................. | H04N 7/163 348/E7.061 |
| 2006/0112143 | A1* | 5/2006 | Subramanian | .... | G06F 17/30017 |
| 2007/0094056 | A1* | 4/2007 | Kang | ..................... | G06Q 10/02 705/5 |
| 2007/0101157 | A1* | 5/2007 | Faria | ................ | G11B 20/00086 713/193 |
| 2011/0314502 | A1* | 12/2011 | Levy | ..................... | H04N 7/106 725/46 |
| 2012/0223885 | A1 | 9/2012 | Perez | | |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jay Huang
(74) *Attorney, Agent, or Firm* — Lee & Hayes, P.C.

(57) ABSTRACT

Digital content such as eBooks, music, video, personal files, and so forth stored in cloud storage resources are selectively transferred to an onboard storage device of a conveyance such as an aircraft, train, motorcoach, and so forth. Travelers may access the content from the onboard storage as if the cloud were still accessible.

19 Claims, 7 Drawing Sheets

(CONTINUED FROM FIG. 3)

314 — FIRST CONVEYANCE ARRIVES, TRAVELER SWITCHES TO SECOND CONVEYANCE, AND TRAVELER SPECIFIC CONTENT IS DELETED

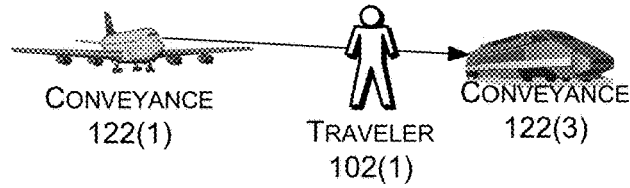

316 — TRAVELER EN ROUTE CONSUMES CONTENT WITH PORTABLE ELECTRONIC DEVICE, PURCHASES RIGHTS TO THE DESTINATIONSPECIFIC CONTENT

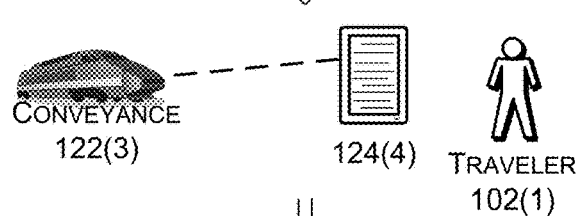

318 — TRANSMIT CONTENT RIGHTS UPDATES TO CONTENT SERVER TO REFLECT RIGHTS TO THE DESTINATION SPECIFIC CONTENT WHICH ARE PURCHASED IN TRANSIT

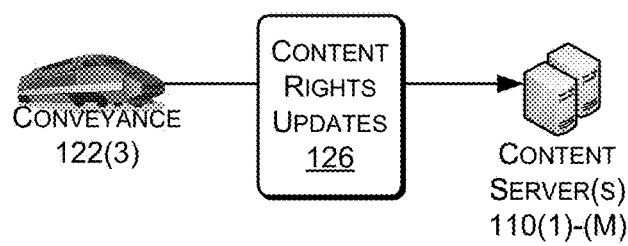

320 — PRELOAD SELECTED CONTENT ASSOCIATED WITH THE TRAVELER TO THIRD CONVEYANCE

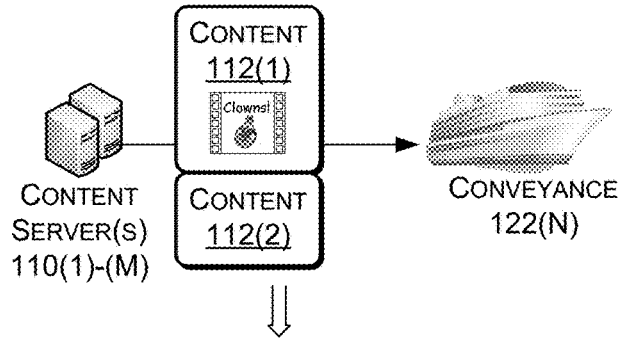

322 — SECOND CONVEYANCE ARRIVES, TRAVELER DISEMBARKS AND EMBARKS ON THIRD CONVEYANCE, AND TRAVELER SPECIFIC CONTENT IS RETAINED FOR RETURN TRIP

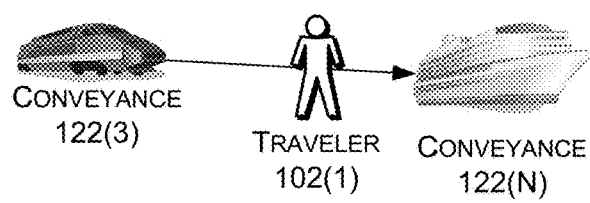

FIG. 4

DYNAMIC CLOUD CONTENT DISTRIBUTION

BACKGROUND

Digital content such as eBooks, video, audio, games, and so forth are increasingly stored in cloud storage resources. These cloud storage resources are then accessed by a user via a network. This offers the user the advantage of being able to readily access content from a variety of devices and locations at which network access is available. However, network access may be prohibitively expensive or impossible in some situations. In particular, conveyances such as aircraft, trains, motorcoaches, ships, and so forth may have no network access, or be limited to expensive and (relatively) slow data connections while in transit.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 3 and 4 depict a series of operations involving a traveler on multiple conveyances and dynamic distribution of cloud content to those conveyances.

DETAILED DESCRIPTION

Figure 1:
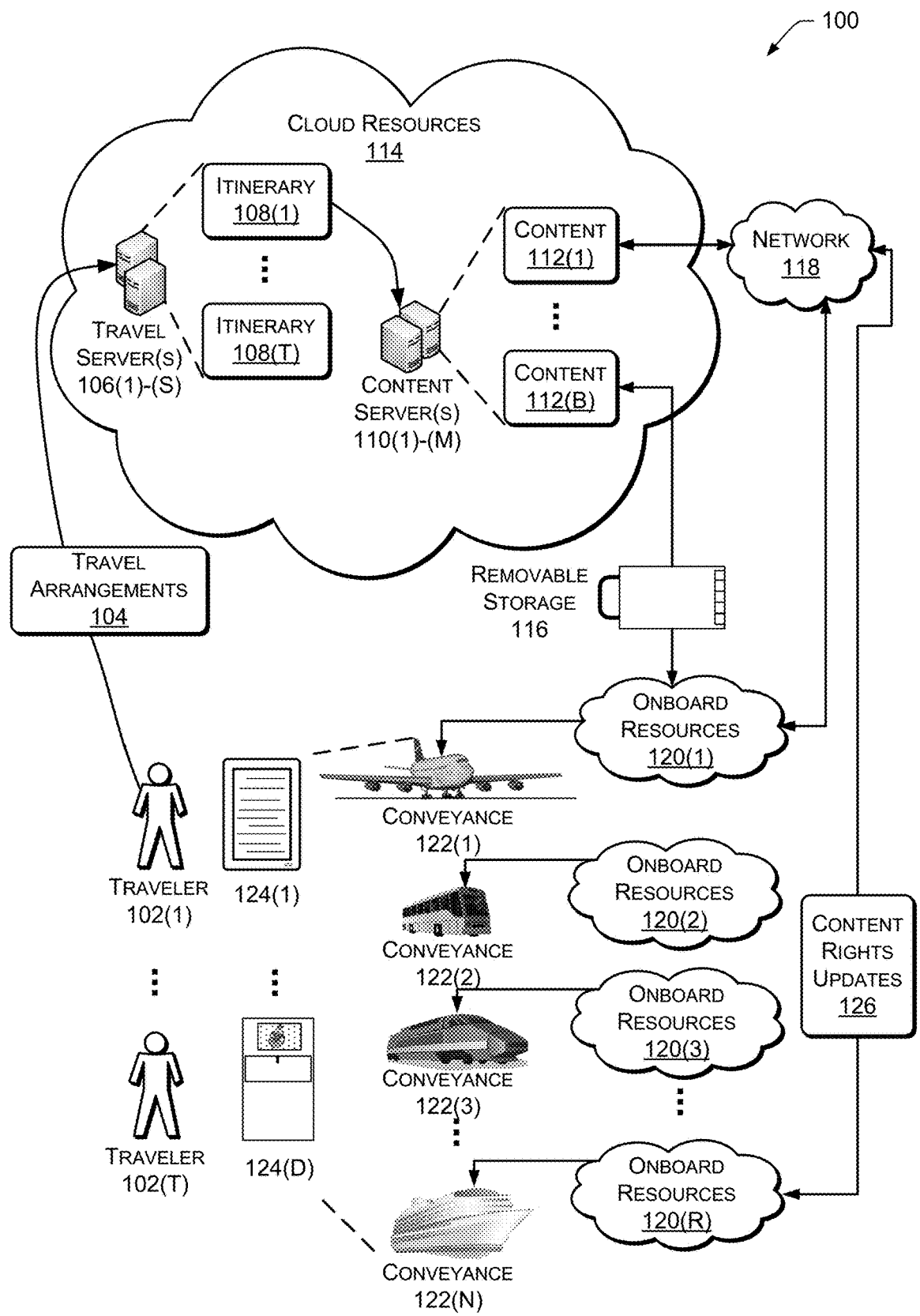
FIG. 1 is an illustrated environment configured to provide dynamic cloud content distribution to conveyances.

Digital content continues to proliferate in terms of the volume of content being created, the number of devices that can access digital content, and the number of users who are accessing and consuming the digital content. Digital content may include eBooks, video, multimedia presentations, audio, pictures, applications, and so forth. This content may be stored in cloud resources that are stored in one or more servers available via a network such as the Internet. Content may reside within cloud storage resources, on an individual portable device, or a combination thereof. For example, some content may be available only in a streaming format from a cloud resource, or may be stored locally on a portable electronic device but require access to a digital rights management server in the cloud to provide access to content.

While cloud storage conveys many benefits including virtually unlimited storage capacity for a user and comprehensive digital rights management features, when the cloud is inaccessible access to the content is lost. For example, despite nearly ubiquitous Internet connectivity, the cloud resources may be inaccessible while a user is traveling on a common carrier. Common carriers include entities which commercially operate conveyances such as aircraft, trains, ships, motorcoaches, and so forth for transport of travelers from one geographic location to another.

Even where Internet access is available on a common carrier, such mobile Internet access may be costly or constrained. As a result, mobile Internet on the common carrier may be unable to support access to bandwidth intensive content such as streaming video and effectively sever a traveling user from the cloud resources. Furthermore, given the increasing amount of digital content which users may have acquired access rights to, the portable electronic devices travelers use to access content may have storage capacity to carry only a fraction of the traveler's total content.

Described herein are techniques and devices for dynamic cloud content distribution. Dynamic cloud content distribution allows at least a portion of the travelling user's cloud content to be stored onboard and travel with the user on a given conveyance. Information about the traveler's itinerary is used to pre-load at least a portion of the content for which the traveler has access rights onto onboard storage on the conveyance. While primary cloud resources are inaccessible during travel, the traveler may access the locally stored content. Other content may also be made available to the user during transit. For example, content which relates to the end destination of the user or which is recommended for travelers may also be provided. Access rights to such content may be provided as part of the price for transport, or sold to travelers.

An onboard digital rights management module may also provide digital rights management (DRM) functions to allow users with content stored locally on their individual devices to access content which would otherwise require interaction with the cloud prior to presentation. For example, an episode of a popular television show may require a realtime unlock code before presentation. The DRM module onboard may provide this unlock code during transit.

Content brought onboard the conveyance may also be uploaded to the onboard storage device for distribution to other travelers. For example, on a long transatlantic flight, one traveler may have a local copy of a documentary on their smartphone. The copy may be transferred to the onboard storage device, and access rights may be provided to other travelers on that same flight in compliance with contract terms for a content owner.

Dynamic Cloud Content Distribution Environment

FIG. 1 is an illustrated environment 100 configured to provide dynamic cloud content distribution to conveyances. Travelers 102(1), 102(2), . . . , 102(T), as shown. When a traveler 102 decides to take a trip, the traveler makes some sort of travel arrangements 104 which may include a point of departure, destination, travel preferences, and so forth. These travel arrangements 104 are communicated via a travel agent, online website, data connection, and so forth to one or more travel servers 106(1), 106(2), . . . 106(S). The travel servers 106 are configured to accept travel arrangements 104 and generate one or more itineraries 108(1), 108(2), . . . 108(T). The itinerary 108 may be specific to a particular traveler 102, or shared by multiple travelers 102 such as in the case of a group trip.

The itinerary 108, or at least a portion thereof, is provided to one or more content servers 110(1), 110(2), . . . , 110(M). The content servers 110 are configured to provide content to users. This content may include eBooks, video, audio, games, pictures, applications, and so forth. Content may be provided via streaming, online process, download to a device, and so forth via a network connection, such as the Internet. The content servers 110 maintain copies of the content, and may provide digital rights management (DRM) functions including management of user access rights. For example, the content servers 110 may provide unlock codes allowing a user to consume content stored on a portable electronic device. Altogether, the travel servers 106, content servers 110, and other resources may be collectively referred to as cloud resources 114.

As described above, when in transit, the cloud resources 114 may not be accessible, or may only be accessible via high-cost connections with limited capabilities. This may result in the travelers 102(T) experiencing an undesirable loss of access to content 112 during travel. To provide access to the content 112 during travel, at least a portion of the content 112 which is associated with a particular traveler 102, particular route, and so forth, may be transferred to an onboard storage device on a conveyance.

As shown here, the content 112 may be stored on a removable storage device 116. This removable storage device 116 may comprise a magnetic memory, optical memory, solid state memory, or combination thereof. For example, the removable storage device 116 may comprise a plurality of magnetic hard drives. In some implementations, the content 112 may be transferred via a network 118. Whether via the removable storage 116 or the network 118, the content 112 is provided and becomes part of onboard resources 120 for a conveyance 122. The network 118 may include the Internet or a private network configured to couple with the conveyance 122 while the conveyance 122 is at a hub, airport, station, port, and so forth.

The conveyances 122(1), 122(2), . . . , 122(N) may include aircraft, motorcoaches, trains, ships, dirigibles, submarines, spacecraft, and so forth. These conveyances 122 may be operated as a common or public carrier, providing transport to members the general public, including the travelers 102(T). The onboard resources 120 may differ from conveyance to conveyance and are described in more detail below with regards to FIG. 2

The travelers 102 on the conveyances 122 may access the content 112 which is stored within the onboard resources 120 on each conveyance 122. Such access may be via access devices 124(1), 124(2), . . . , 124(D). These access devices 124 may include devices mounted to the conveyance such as seatback display screens, portable user electronic devices such as smartphones, laptops, tablet computers, and so forth. The portable user electronic devices may be brought onboard by the user, or provided for use by the traveler 102 onboard the conveyance 122.

During transit, the travelers 102(T) may acquire access rights to additional content 112. For example, the traveler 102(1) may purchase rights to a movie which traveler 102(2) is watching. Content rights updates 126 may be provided from the onboard resources 120 to the content servers 110, such as via the network 118. In some implementations, these content rights updates 126 may take place via an in-transit communication link, or via direct connection of a docked communication link when the conveyance 122 is back at an airport, station, port, and so forth.

In another implementation, the traveler 102 may have boarded the conveyance 122 without a prior itinerary and thus content 112 may not have been pre-loaded onto the onboard resources 120. In this situation, the content rights updates 126 may be used to interrogate the content servers 110 and determine what content 112 the traveler 102 has access rights to which is available from the onboard resources 120. For example, a last minute traveler who purchases a train ticket at the station and departs immediately may be provided with access to an audiobook which he has previously acquired access rights to and which is available in the onboard resources 120 of that train after transfer of a content rights update 126.

Figure 2:
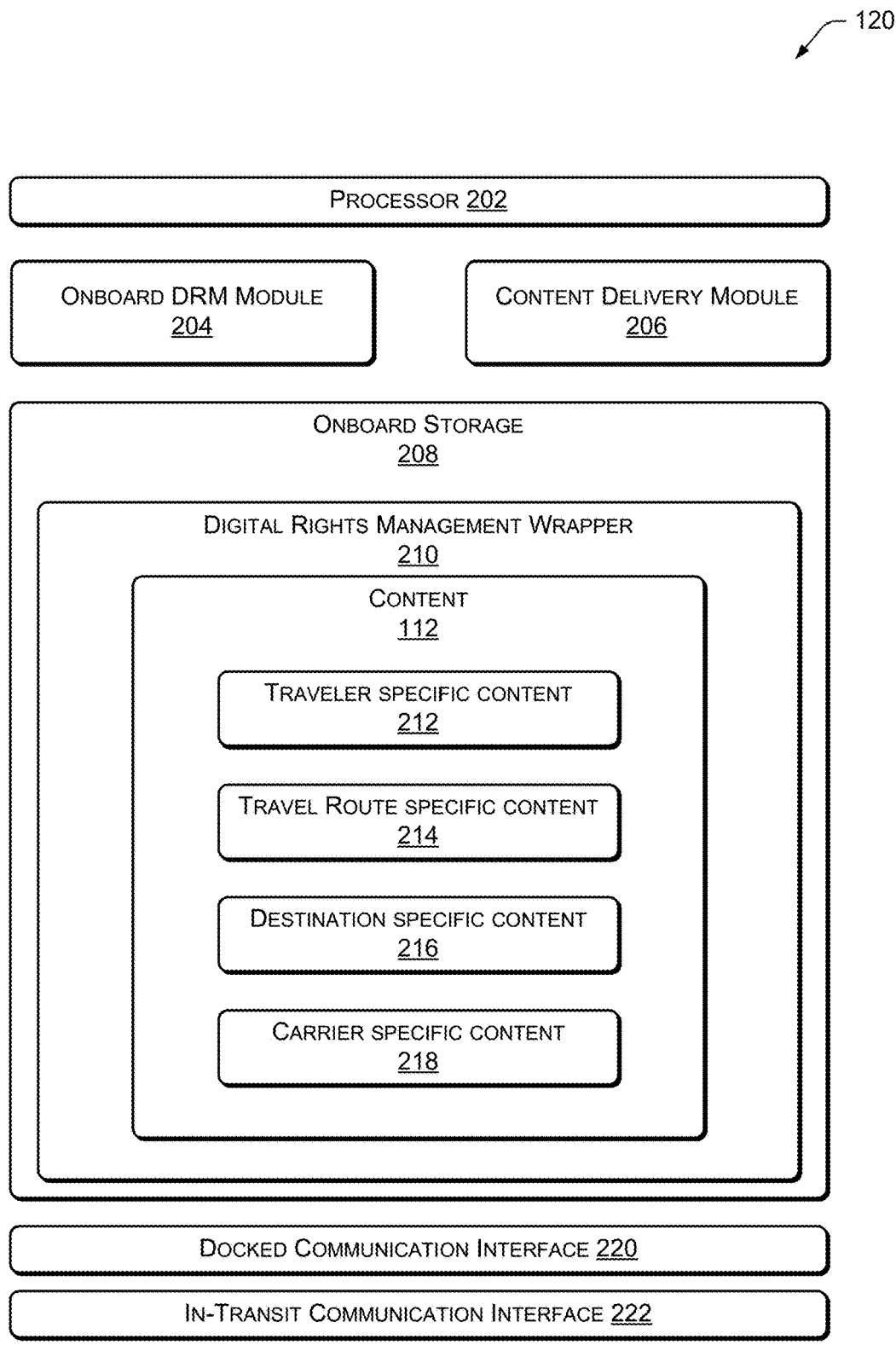
FIG. 2 is a block diagram of an illustrative architecture of the onboard resources configured to provide dynamic cloud content to travelers onboard the conveyance.

FIG. 2 is a block diagram of an illustrative architecture of the onboard resources 120 which are configured to provide dynamic cloud content to travelers 102 onboard the conveyance 122. A processor 202 is shown which is configured to execute instructions. Coupled to the processor 202 is an onboard digital rights management (DRM) module 204. The onboard DRM module 204 is configured to provide DRM functions such as securing digital content, provide access rights, maintaining limitations on digital rights usage, providing unlock codes, and so forth.

The onboard DRM module 204 may also filter content for delivery based upon carrier parameters. Carrier parameters may include content ratings such as provided by the Motion Picture Association of America, Entertainment Software Rating Board, particular content, and so forth. For example, an airline common carrier may select to filter content from presentation which contains aircraft hijacking related themes, or "R" rated content which may be visible and objectionable to others in the confined environment of an aircraft.

The onboard DRM module 204 may also be configured to provide DRM functions to allow travelers 102 with content 112 stored locally on their individual devices 124 to access content 112 which would otherwise require interaction with the cloud resources 114 such as the content servers 110 prior to presentation. For example, an episode of a popular television show may require a realtime unlock code before presentation. The onboard DRM module 204 may provide this unlock code in place of the content servers 110.

In addition to receiving content 112 via removable storage 116 or the network 118, the content 112 may be brought onboard in the local storage of the devices 124 carried by the travelers 102 themselves. In some implementations, this content 112 may be uploaded to the onboard storage 208 and be available for other travelers 102. For example, on a long transatlantic flight, one traveler 102(1) may have a local copy of a documentary about sheep entitled "Sheep of Peru" on his smartphone. After chatting with a neighbor across the aisle and stirring his interest and that of several other travelers 102 within earshot, the onboard resources 120 may see several requests for this particular documentary. A copy of the documentary may then be transferred to the onboard storage 208 and access rights may be provided via the onboard DRM module 204 to other travelers 102. The provisioning of these rights may be done in accordance with the contract terms associated with the content 112.

A content delivery module 206 is configured to couple with the onboard DRM module 204 and provide content 112 to the access devices 124. The content delivery module 206 may provide the content 112 to the access devices 124 via a local area network on the conveyance 122. This local area network may be wired or wireless.

The onboard resources 120 include onboard storage 208. The onboard storage 208 may include computer-readable storage media (CRSM). The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the content 112 and which can be accessed by the processor 202. In some implementations, the onboard DRM module 204, content delivery module 206, or both may also be stored within the onboard storage 208.

Within the onboard storage 208, a digital rights management (DRM) wrapper 210 may encapsulate the content 112. This DRM wrapper 210 may be configured to provide overarching protection, such as locking the content 112 such that it is accessible only by a particular conveyance 122 or route. In other applications, each individual piece of content 112 or clusters of content 112 may have individual DRM wrappers 210.

The content 112 which may be maintained in the onboard storage 208 may fall into several categories. Each category may have pre-defined access rights, longevity within the onboard storage 208, and so forth. Traveler specific content 212 is content 112 which is associated with a particular traveler 102. For example, traveler specific content 212 may be the eBook "Expanded Literary Edition of Romeo and Juliet" associated with traveler Bob Smith.

Travel route specific content 214 may also be stored in the onboard storage 208. This content is associated with a particular leg of an overall trip, or the entire trip. For example, consider a trip with two legs running from Austin to San Jose to Seattle. Each leg may have specific travel route specific content 214, such as a travelogue commentary for the Austin to San Jose leg describing the Grand Canyon and Sierra Nevada mountains as visible during the flight and another describing the Oregon coast on the San Jose to Seattle leg.

Destination specific content 216 is content associated with the ultimate destination of the traveler 102 or the conveyance 122. For example, a flight destined for Nassau may have destination specific content 216 including documentaries and travel guides about Nassau available.

Carrier specific content 218 may also be stored. Carrier specific content 218 may comprise content for which the carrier operating the conveyance 122 has received particular rights, original content, and so forth. For example, airline carrier "AmPan" may have acquired special rights to provide a newly released movie to passengers onboard its aircraft. Carrier specific content 218 may also include pre-flight briefing instructions, traveler information, in-flight magazine content, and so forth.

The onboard resources 120 may include a docked communication interface 220. The docked communication interface 220 provides a relatively high speed data connection between the conveyance 122 and the content servers 110 or other cloud resources 114. The docked communication interface 220 may include a cabled connection such as wire, fiber optics, or wireless such as short range radio frequency or optical transceivers. For example, a ship in port may be connected to a dockside fiber optic data connection via the docked communication interface 220. Or a relatively short range WiFi connection may be used to couple a train to the network 118 while the train is in or near the station.

An in-transit communication interface 222 may also be provided. As mentioned above, this in-transit communication interface 222 may provide an in-transit communication link which is limited in capabilities or which is costly to use. The in-transit communication interface 222 may comprise a wireless wire area network (WWAN) modem, satellite up/downlink terminal, and so forth. Compared to the docked communication interface 220, the link provided by the in-transit communication interface 222 may be more expensive and may provide lower bandwidth, increased latency, and so forth.

In some implementations other devices may be part of the onboard resources 120. For example, a global positioning system receiver or other navigational input may provide a geographic location for the conveyance 122 to facilitate compliance with access rights specific to geographic locations. For example, the movie "Clowns!" may be banned in Lithuania and thus not be accessible while the conveyance 122 is within that country's borders. In another implementation, accelerometers may be used to determine when the conveyance 122 is in motion and limit access to content based at least in part upon this.

Illustrative Scenario

Figure 3:
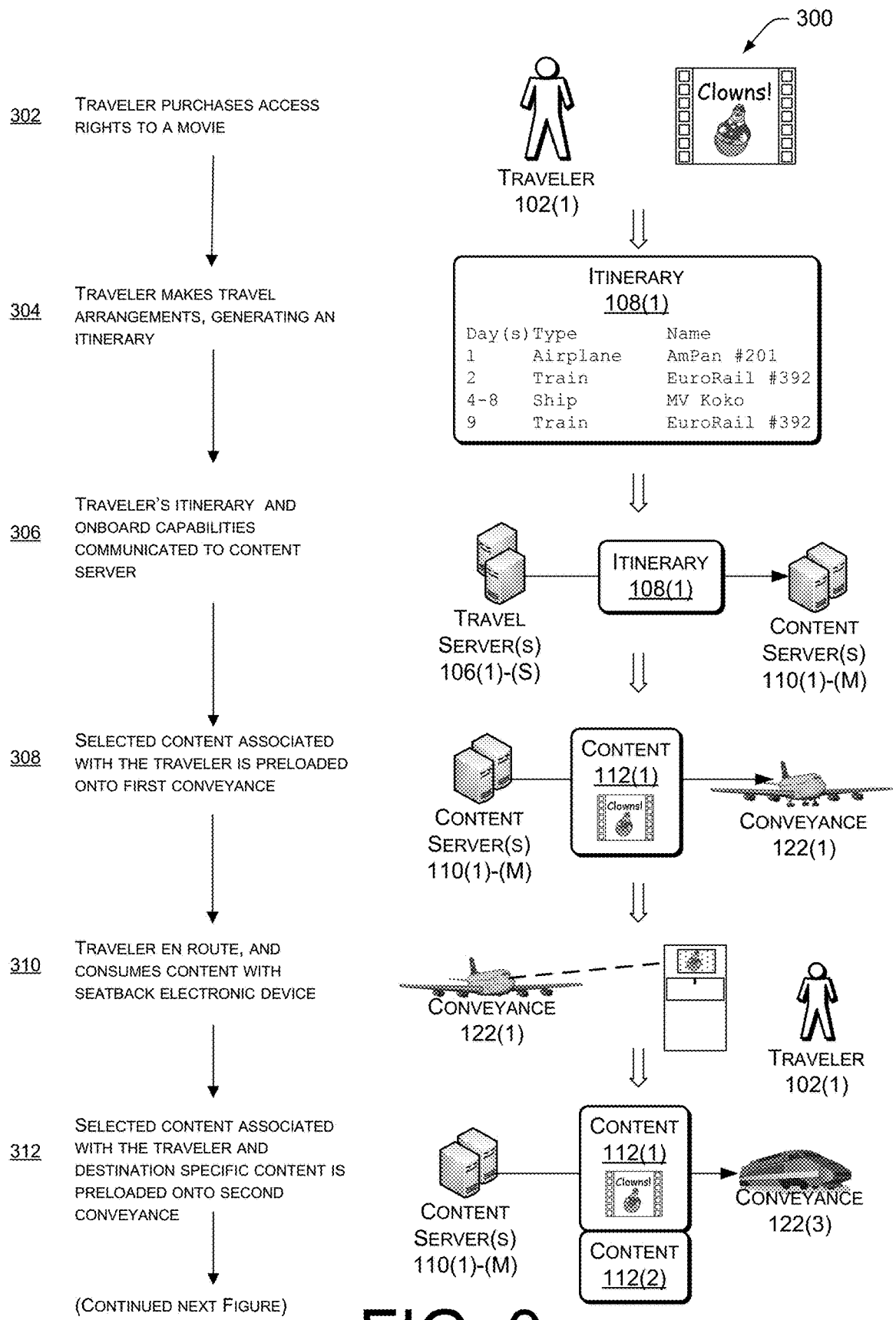

FIGS. 3 and 4 depict a series of operations 300 involving a traveler on multiple conveyances and dynamic distribution of cloud content to those conveyances. It is to be appreciated that FIGS. 3 and 4 illustrate one example scenario, and that the techniques described herein may support various other similar or different usage scenarios.

At 302, the traveler 102 has purchased access rights to content 112 such as a movie entitled "Clowns!" At 304, the traveler 102 makes travel arrangements 104, generating an itinerary 108. As shown here, the traveler 102 will be taking an airplane, a train, a ship, and then the train again.

At 306, the traveler's itinerary 108 and the onboard capabilities of the conveyances 122 involved in the itinerary are communicated to the content servers 110. At 308, prior to the traveler boarding the conveyance 122, selected content 112 is preloaded onto the onboard storage 208 of the first conveyance as part of the onboard resources 120. In some implementations, the selection may be based upon one or more of the following including user preferences, user input, onboard resources 120, recommendations made by the content servers 110, and so forth. When made, the recommendations may be based at least in part upon the travelers 102 past preferences, usage patterns of similar travelers, and so forth. In this example, the content 112 of the movie "Clowns!" is preloaded onto the removable storage 116 at a maintenance facility in the airport where the aircraft is located because the user has previously selected that he would like it available while travelling. This removable storage 116 is then coupled to the aircraft prior to departure.

At 310, the traveler 102 boards the conveyance 122, in this case an aircraft, and his content 112 is accessible to him, as if he continued to have access to the content servers 110. The traveler 102 here is shown viewing the movie on a seatback display in the aircraft.

At 312, selected content 112 associated with the traveler 102 and destination-specific content is preloaded onto the onboard storage 208 of the second conveyance 122(3) as part of the onboard resources 120 for that conveyance 122(3). In this example, the preloading may be via a local wireless connection such as a WiFi connection via an access point in the train station and the docked communication interface 220 as part of the onboard resources 120 of the conveyance 122(3).

In some implementations content 112 may be transferred between conveyances 122 which are in or at a terminal, station, dock, and so forth. For example, when the traveler 102 changes planes at an airport hub, the content 112 may be transferred from one aircraft to another via a local area network at the terminal which couples the aircraft. In some implementations, a local storage server may be coupled to the local area network to provide for temporary storage of content 112. For example, the content 112 may be transferred to the local storage server from a first aircraft and held there until the second aircraft arrives and connects to the local area network, at which time the content 112 may be transferred to the second aircraft.

Continuing to FIG. 4, at 314 the first conveyance 122(1) aircraft arrives, and the traveler 102 disembarks and embarks on the second conveyance 122(3). Because the traveler 102 is not scheduled to return on that same aircraft, traveler-specific content is deleted or may be locked out by the onboard DRM module 204. In some implementations all or a portion of that traveler-specific content may be retained to increase content available on that conveyance 122 until communication with the cloud resources 114 is restored.

At 316, the traveler 102 while en route on the second conveyance 122(3) (here a train) consumes content with the access device 124 such as an eBook reader device. While en route, the traveler 102 may choose to purchase access rights to the destination-specific content 216 which is available. Once rights have been acquired, such as managed by the onboard DRM module 204, the content 112 is delivered to the portable electronic device 124 via the content delivery module 206. For example, a local WiFi, Bluetooth, or other wireless networking standard may be used to provide communication between the content delivery module 206 in the onboard resources 120 and the devices 124.

In some implementations the traveler 102 may transition between devices 124 while consuming content 112, or consume multiple pieces of content 112 simultaneously. For example, the traveler 102 may have the movie "Clowns!" playing on the seatback display device 124 while accessing a magazine on the eBook reader device 124.

At 318, the onboard resources 120 provide to the content server 110, such as via the in-transit communication interface 222, content rights updates 126. These content rights updates 126 reflect the purchase of the destination-specific content 216 by the traveler 102.

At 320, again the content servers 110 preload selected content 112 associated with the traveler to the third conveyance 122(N). For example, the traveler 102 has purchased rights to the destination-specific content 216, which is now provided along with the movie "Clowns!" to the onboard resources 120 onboard the ship.

At 322, the second conveyance 122(3) has arrived at its destination train station, and the traveler disembarks and proceeds to embark on the third conveyance 122(N). Because the itinerary 108(1) indicates that the same traveler 102 will be returning via this train, the onboard DRM module 204 in the second conveyance 122(3) may be configured to retain the content 112 associated with the traveler 102. In some implementations the DRM module 204 may be configured to retain content associated with a traveler 102 in different modes. For example, in one mode content 112 may be maintained when the traveler 102 is scheduled to travel within a pre-determined number of days, while in another mode the oldest content 112 is removed first.

As described above, the content 112 associated with the traveler 102 will continue to follow the traveler 102 based at least in part upon his itinerary. As the traveler 102 continues on the ship, and then returns on the train, his cloud content 112 will in many instances be one step ahead of him, as described above.

Processes of Dynamic Cloud Content Distribution

Several processes are described herein. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the following processes are described with reference to the architectures of FIGS. 1-2.

Figure 5:
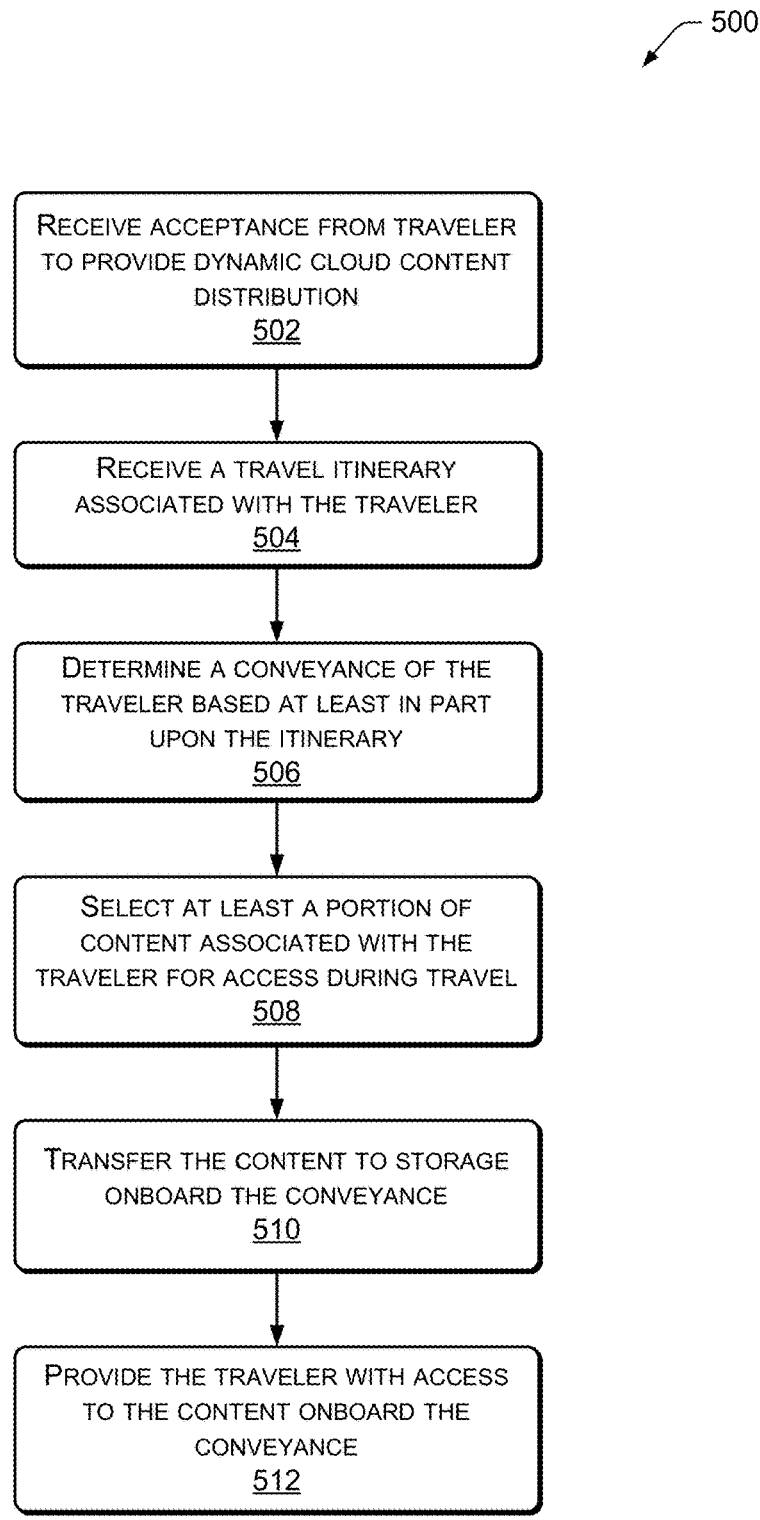
FIG. 5 is a flow diagram of an illustrative process of providing the traveler with cloud content onboard the conveyance.

FIG. 5 is a flow diagram of an illustrative process 500 of providing the traveler 102 with cloud content 112 onboard the conveyance 122. In some implementations, the following operations may be performed at least in part by one or more of the content servers 110. At 502, acceptance to provide dynamic cloud content distribution is received from the traveler 102. This acceptance allows the traveler 102 to control distribution of information about their itinerary 108. In some implementations, the traveler 102 may also limit the timing and nature of itinerary details such that only a portion of the itinerary 108 is released at particular instances. For example, suppose the traveler 102 is a politician and is concerned about having her whereabouts known too far in advance for security reasons. The traveler 102 may select to only have the portion of the itinerary for the next twelve hours released to the content servers 110, rather than disclosing the entire itinerary 108 all at once.

At 504, the travel itinerary 108 associated with the traveler 102 is received. The itinerary 108, or a portion thereof, may be received via file transfer, email, text messaging, database extract, manual input, and so forth. In some implementations the traveler 102 may directly provide itinerary information to the content server 110. For example, the traveler 102 may send a text message "On AmPan Flight 201 tomorrow" to the content server 110 or an associated gateway interface service. Using the telephone number which sent the text message, the content server 110 may determine that traveler 102(1) is on AmPan flight #201 tomorrow, and dynamically distribute cloud content 112 as described above.

At 506, a conveyance 122 of the traveler 102 is identified based at least in part upon the itinerary 108. The travel servers 106 may provide details about the trip and the particular conveyance 122. Information about the conveyance may range from a simple flag indicating the presence of onboard resources 120 to a detailed specification as to what onboard resources 120 are available. For example, the itinerary 108 may include that AmPan flight 201 has a duration of seven hours and is on a Boeing 737-800 with in-flight seatback devices 124, five terabytes of onboard storage 208, and full onboard DRM support capabilities. In another implementation, the content servers 110 may communicate with other devices to retrieve information about the conveyances 122.

At 508, at least a portion of the content 112 associated with the traveler 102 is selected for access during travel. This selection may be based upon several factors. The traveler 102 may have pre-defined selections as to what content is preferred for dynamic cloud distribution. For example, the traveler 102 may indicate that while traveling he prefers movies to audiobooks. The selection may be based upon recommendations made by the content servers 110. These recommendations may be based at least in part upon the travelers 102 past preferences, usage patterns of similar travelers, and so forth. Access during travel includes embarkation and debarkation times. For example, travel as used herein includes the time boarding an aircraft and waiting for unloading as well as time in the air.

At 510, content is transferred to the storage onboard the conveyance 122. For example, content 112 may be transmitted via the docked communication interface 220 for storage in the onboard storage 208. As mentioned above, in some implementations content 112 may be transferred from one access device 124 brought onboard the conveyance 122 by one traveler to the onboard storage 208 for use by other travelers 102. In some implementations only a portion of a particular piece of content 112 may be transferred. For example, only the first ten hours of a twenty hour documentary may be uploaded to the onboard storage 208 for a seven hour flight.

At 512, access to the content 112 onboard the conveyance is provided to the traveler 102 onboard. As mentioned above, in some implementations, the content 112 may also be provided to other travelers 102, such as after proper DRM rights have been assigned. This content 112 may be provided via the access devices 124.

Figure 6:
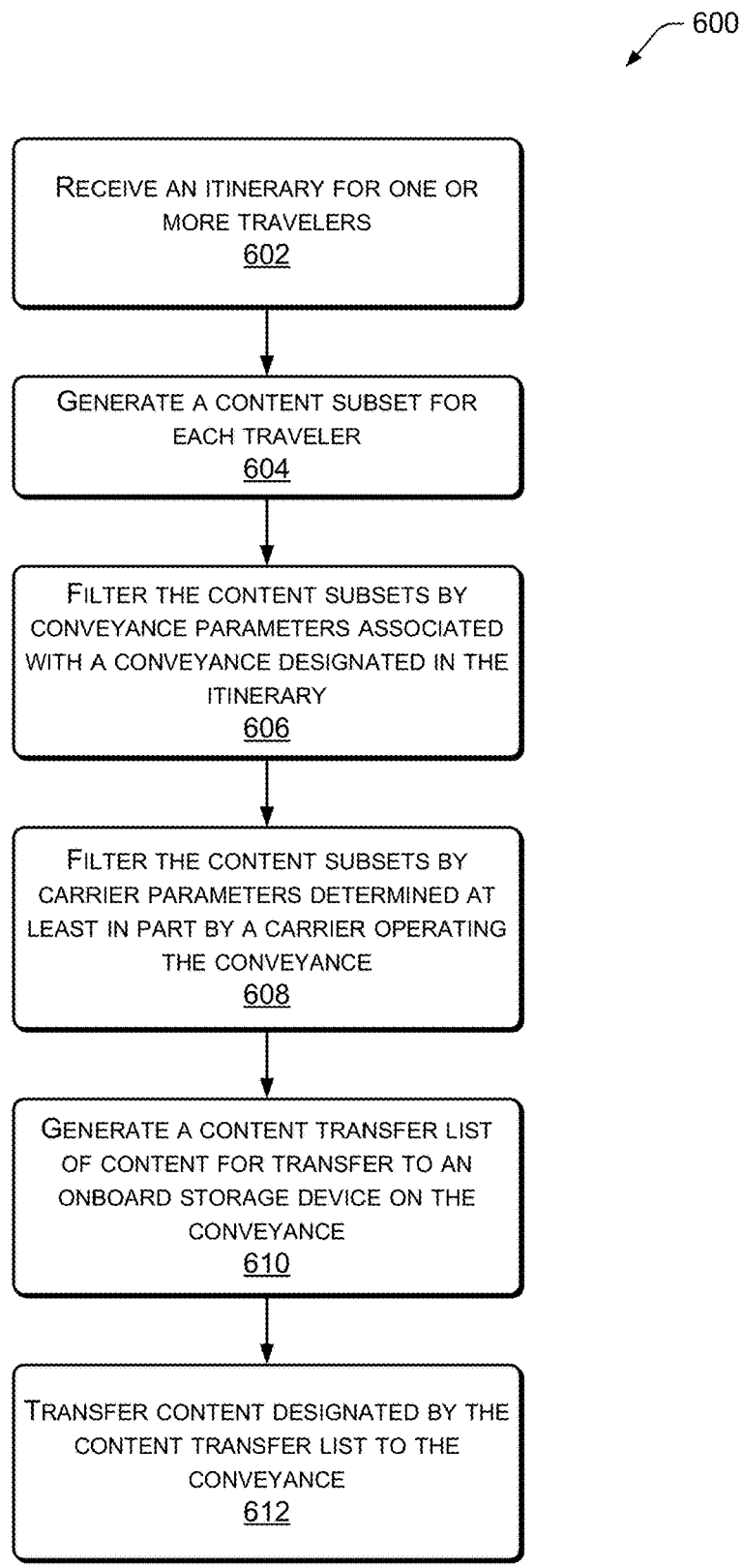
FIG. 6 is a flow diagram of an illustrative process of selecting and transferring content to the conveyance.

FIG. 6 is a flow diagram of an illustrative process 600 of selecting and transferring content to the conveyance. As above, the following operations may be performed at least in part by the content servers 110. As mentioned above, the amount of content 112 which the traveler 102 may have stored in the cloud may be enormous. As such, a complete set of content for a single traveler 102 may exceed the available storage capabilities of the onboard resources 120. As a result, it may be worthwhile in some implementations to select a subset of content for travel for transfer to onboard resources 120.

At 602, an itinerary 108 for one or more travelers 102(T) is received. At 604, a content subset is generated for each traveler 108. This content subset may be based upon the preferences, recommendations, user selections, user input, and so forth described above with regards to 508 in FIG. 5. 1. At 606, the content subsets are filtered by conveyance parameters associated with the conveyance 122 designated in the itinerary 108. For example, the onboard DRM module 204 for the particular conveyance 122 may have only limited DRM support functionality for content licensed for consumption in the United States, and not the United Kingdom. As a result, content 112 for travelers 102 with content accounts in the United Kingdom would be inaccessible, and is thus filtered out. In some implementations, the traveler 102 may be provided with a notification of the filtering. This notification may include a list of which content 112 was filtered and is available, unavailable, or both.

In another example, the onboard storage 208 may be limited and so high definition video content is removed or replaced with lower-definition content which consumes less memory. Where content 112 with lesser memory or equipment requirements is available, that content 112 may be selectively used to minimize demand on the onboard resources 120.

At 608, the content subsets are filtered by carrier parameters determined at least in part by a carrier operating the conveyance 122. As mentioned above, the carrier parameters may include content ratings such as provided by the Motion Picture Association of America, Entertainment Software Rating Board, particular content, and so forth. For example, an aircraft carrier may select to filter content from presentation which contains aircraft hijacking related themes, or "R" rated content which may be visible and objectionable to others in the confined environment of an aircraft. In some implementations the user may be presented with a notification as to what content was filtered, not filtered, or both.

At 610, a content transfer list of content for transfer to an onboard storage device on the conveyance is generated. In some implementations this content transfer list may be de-duplicated, to minimize or eliminate duplicative content 112. For example, if travelers 102(1)-(5) all have access rights to the movie "Clowns!" a single copy may be stored in the onboard storage 208, with the onboard DRM module 204 configured to allow access to those travelers. In some implementations the traveler 102 may be presented with at least a portion of the content transfer list associated with that traveler 102. For example, the traveler 102 may see the content transfer list showing what content 112 for which they have rights will be transferred onboard.

At 612, the content 112 designated by the content transfer list is transferred to the conveyance 122. As described above, this transfer may be made by physical transfer of storage media such as the removable storage 116, or via the docked communication interface 220 and associated link. In some implementations the traveler 102 may receive a notification as to what content 112 for which they have rights has been transferred onboard.

Figure 7:
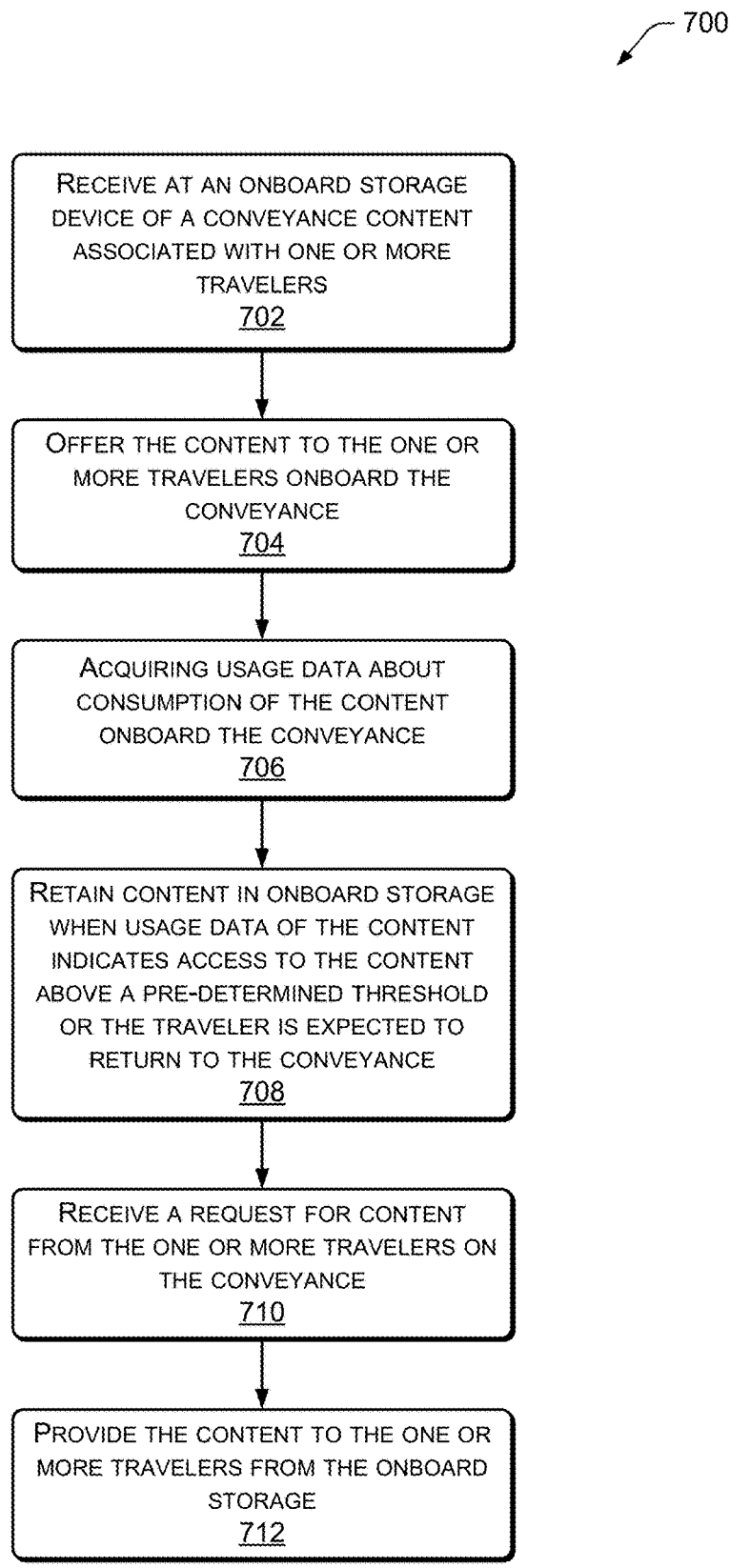
FIG. 7 is a flow diagram of an illustrative process of retaining content onboard a conveyance based at least in part upon usage data.

FIG. 7 is a flow diagram of an illustrative process 700 of retaining content onboard a conveyance based at least in part upon usage data. As described above, because of storage and communication limitations, access to the cloud resources 114 during transit may not be feasible. However, by providing dynamic cloud content distribution, effects on the traveler 102 of this infeasibility are mitigated. Further mitigating this is the advantage that content 112 may be shared among multiple travelers 102 without degradation, in accordance with DRM limitations.

At 702, content associated with one or more travelers 102 is received at an onboard storage device 208 of a conveyance 122. As described above, each of these travelers 102 may have a different content subset. For example, one traveler 102(1) may prefer action movies while another traveler 102(2) reads mystery novels.

At 704, the content 112 available within the onboard storage device 208 is offered to the one or more travelers onboard the conveyance. The content 112 which is offered is content 112 previously determined to be non-private content 112, such as a publicly released movie in contrast to an individual traveler's home movies. In some implementations travelers 102 may be presented with recommendations based upon their particular profiles, or may see a list of the most popular content 112 that others on the conveyance are consuming.

At 706, usage data about the consumption of the content 112 onboard the conveyance 122 is acquired. This usage may include identification of the content, duration of the consumption, demographic information about the traveler consuming the content, and so forth. For example, the usage data may indicate that the documentary "Sheep of Peru" is quite popular, having been watched by fifteen percent of the passengers on the flight. In some implementations usage data including requests for content 112 which is not available in the onboard storage 208 may also be tracked. For example, if travelers 102 are requesting the movie "Cattle of Peru" which is not available, this content may be added to future content transfer lists for the conveyance, route, flight, and so forth.

At 708, content is retained in the onboard storage 208 when usage data of the content 112 indicates access to the convent is above a pre-determined threshold. This pre-determined threshold may be a count of times content was accessed, duration of access, and so forth. For example, given the popularity of "Sheep of Peru", it may be retained in storage for the next flight. The content 112 may also be retained when a particular traveler 102 is expected to return to the conveyance. As described above with regards to FIGS. 3-4, the content for the traveler 102 was retained in the storage of the train for the expected return trip by the traveler.

At 710, a request for content is received from the one or more travelers 102 on the conveyance 122. At 712, the requested content 112 may be provided to the one or more travelers from the onboard storage 208. In some implementations, content 112 may be presented on the access devices 124 without request. For example, a pre-flight briefing involving safety instructions may be presented on access devices 124 without traveler 102 request or intervention.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on one or more computer-readable storage media.

What is claimed is:

1. A method comprising:
receiving, at one or more servers, input from one or more computing devices associated with a user, the input indicating an acceptance from the one or more computing devices to be provided with dynamic cloud content distribution while the one or more computing devices are determined to be onboard a mode of transportation such that content associated with the user stored in the one or more servers is allowed to be stored onboard the mode of transportation while the one or more computing devices are on the mode of transportation, wherein access rights to the content stored on the one or more servers were obtained prior to a start time of an initial event of a travel itinerary associated with the user, the one or more servers providing the content via streaming;
receiving, at the one or more servers, the travel itinerary associated with the user, the travel itinerary specifying the mode of transportation;
determining the mode of transportation of the user based at least in part upon the travel itinerary;
determining that access to a network aboard the mode of transportation is available during a time period indicated in the travel itinerary;
determining that a network connectivity of the network aboard the mode of transportation is one of unavailable or insufficient to support the streaming of the content to a user device for at least a portion of the time period indicated in the travel itinerary, the portion of the time period being less than an entirety of the time period;
based at least in part on determining that the network connectivity of the network on the mode of transportation is one of unavailable or insufficient, selecting at least a portion of the content associated with the user stored on the one or more servers for storage onboard the mode of transportation; and
prior to a departure time of the mode of transportation indicated by the travel itinerary, sending, at least in part by the one or more servers, the portion of the content from the one or more servers to storage onboard the mode of transportation, wherein the one or more computing devices onboard the mode of transportation access the portion of the content via the storage onboard the mode of transportation.

2. The method of claim 1, further comprising filtering at least one of the portion of the content or a second portion of the content based at least in party on functionality of the mode of transportation.

3. The method of claim 1, wherein the sending the portion of the content to the storage onboard the mode of transportation comprises coupling the mode of transportation to the network.

4. The method of claim 1, filtering at least one of the portion of the content or a second portion of the content based at least in part on a parameter determined by a carrier of the mode of transportation.

5. A method comprising:
receiving a travel itinerary associated with a user, the user having previously obtained access rights to content stored on one or more servers, the one or more servers providing access to the content via streaming;
determining a mode of transportation that is to be used for transportation by the user based at least in part upon the travel itinerary;
determining that access to a network aboard the mode of transportation is available during a time period indicated in the travel itinerary;
determining that a network connectivity of the network aboard the mode of transportation is one of unavailable or insufficient to support streaming of the content to a user device for at least a portion of the time period indicated in the travel itinerary, the portion of the time period being less than an entirety of the time period;
selecting, prior to a start of the travel itinerary, a first portion of the content; and
causing, upon the user device being onboard the mode of transportation, the first portion of the content to be sent from the one or more servers to onboard storage of the mode of transportation, wherein one or more other computing devices onboard the mode of transportation access the first portion of the content via the onboard storage of the mode of transportation.

6. The method of claim 5, further comprising receiving an acceptance from the user device to provide dynamic cloud content distribution while onboard the mode of transportation.

7. The method of claim 5, further comprising physically transferring storage media storing a second portion of the content to the onboard storage of the mode of transportation.

8. The method of claim 5, wherein the sending the first portion of the content to the onboard storage of the mode of transportation comprises coupling the mode of transportation to the network.

9. One or more non-transitory computer-readable media storing computer-executable instructions that, when executed by one or more processors, cause the one or more processors to perform acts comprising:
receiving a travel itinerary associated with a user, the user having obtained access rights to content stored on one or more servers prior to a start time of an initial event of the travel itinerary, the one or more servers providing access to the content via streaming;

determining a mode of transportation that is to be used for transportation by the user based at least in part upon the travel itinerary;

determining that access to a network aboard the mode of transportation is available during a time period indicated in the travel itinerary;

determining that a network connectivity of the network aboard the mode of transportation is one of unavailable or insufficient to support the streaming of the content to a user device for at least a portion of the time period indicated in the travel itinerary, the portion of the time period being less than an entirety of the time period;

based at least in part on determining that the network connectivity of the network aboard the mode of transportation is one of unavailable or insufficient, selecting at least a portion of the content for sending from the one or more servers to an onboard storage of the mode of transportation such that one or more computing devices associated with the user are able to access the portion of the content while onboard the mode of transportation; and sending the portion of the content to the onboard storage of the mode of transportation prior to a departure time of the mode of transportation, wherein the one or more computing devices onboard the mode of transportation access the portion of the content via the onboard storage of the mode of transportation.

10. The one or more non-transitory computer-readable media of claim 9, the acts further comprising receiving an acceptance from the one or more computing devices associated with the user to provide dynamic cloud content distribution while onboard the mode of transportation.

11. The one or more non-transitory computer-readable media of claim 9, wherein the sending the portion of the content to the onboard storage of the mode of transportation comprises retrieving the portion of the content from computer-readable storage media within the one or more computing devices of the user while the one or more computing devices are aboard the mode of transportation.

12. The one or more non-transitory computer-readable media of claim 9, wherein the sending the portion of the content to the onboard storage of the mode of transportation comprises coupling the mode of transportation to the network.

13. The method of claim 1, wherein the sending comprises sending respective copies of the portion of the content from the one or more servers to the storage onboard the mode of transportation.

14. The method of claim 5, further comprising filtering at least a second portion of the content according to functionality of the mode of transportation.

15. The method of claim 5, further comprising filtering at least a second portion of the content according to a parameter determined by a carrier of the mode of transportation.

16. The method of claim 5, further comprising:

deriving a time based at least in part on the travel itinerary; and determining that the time is a boarding time associated with the mode of transportation.

17. The one or more non-transitory computer-readable media of claim 9, wherein the sending the portion of the content to the onboard storage of the mode of transportation comprises physically transferring storage media storing the portion of the content to the onboard storage of the mode of transportation.

18. The one or more non-transitory computer-readable media of claim 9, the acts further comprising determining an amount of available storage of the onboard storage of the mode of transportation; and wherein the selecting the at least the portion of the content for sending from the network-accessible storage resources to the onboard storage of the mode of transportation comprises determining the at least the portion of the content based at least in part on the amount of available storage of the onboard storage of the mode of transportation.

19. The one or more non-transitory computer-readable media of claim 9, the acts further comprising determining a duration of travel onboard the mode of transportation based at least in part on the travel itinerary; and wherein the selecting the at least the portion of the content for sending from the network-accessible storage resources to the onboard storage of the mode of transportation comprises determining the at least the portion of the content based at least in part on the duration of the travel onboard the mode of transportation.

* * * * *